Sept. 6, 1966　　　J. F. FLODIN ET AL　　　3,270,662
CRAB COOKING APPARATUS
Filed April 26, 1965　　　　　　　　　　　2 Sheets-Sheet 1
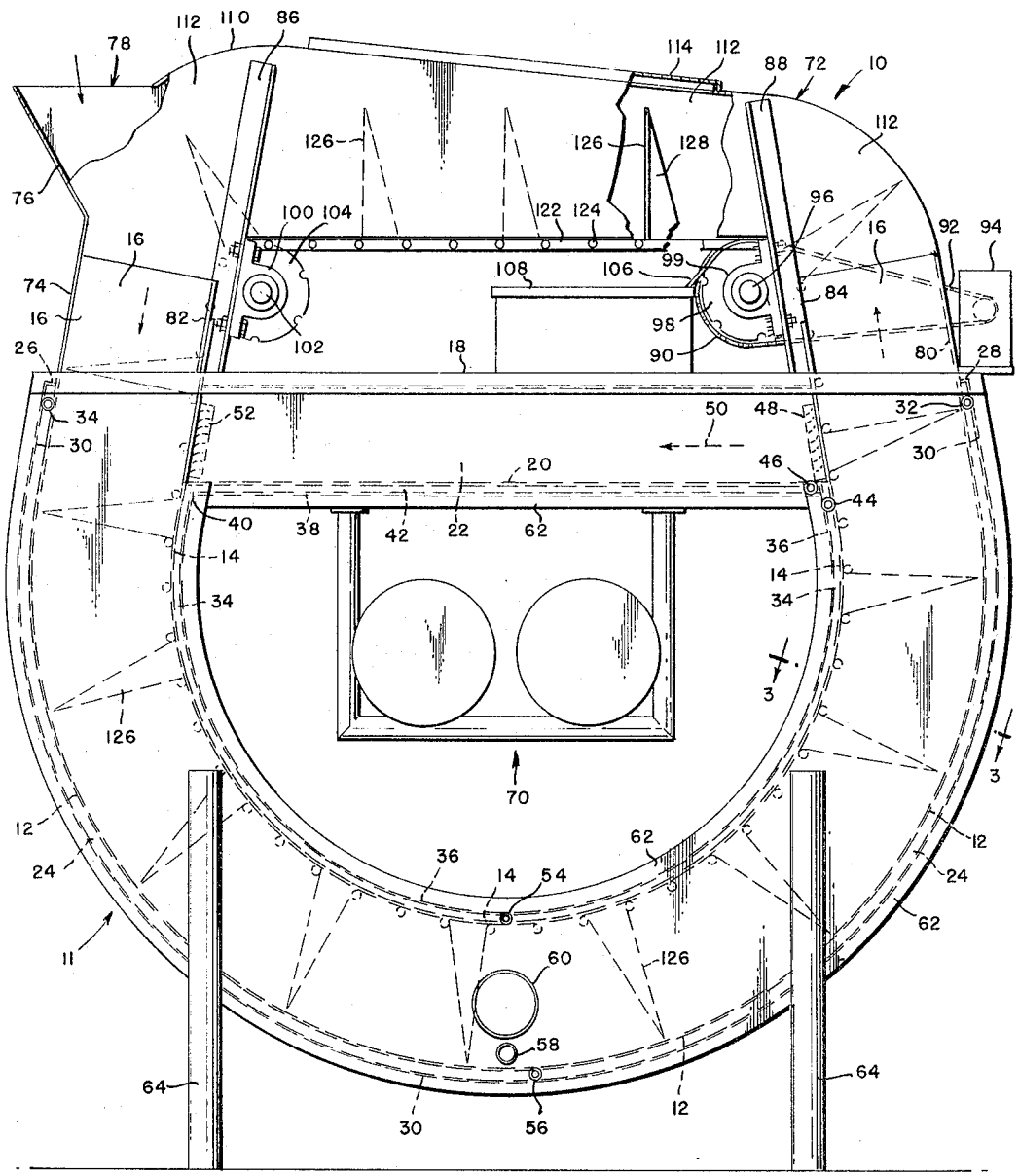
FIG—1
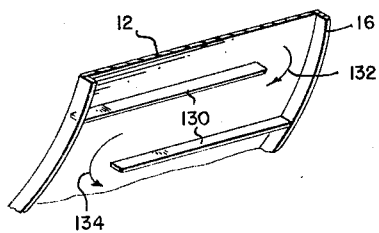
FIG—2
JOHN F. FLODIN
ALLAN T. FLODIN
  INVENTORS
BY
*Graybeal, Cole & Barnard*
ATTORNEYS Sept. 6, 1966 J. F. FLODIN ET AL 3,270,662
CRAB COOKING APPARATUS
Filed April 26, 1965 2 Sheets-Sheet 2
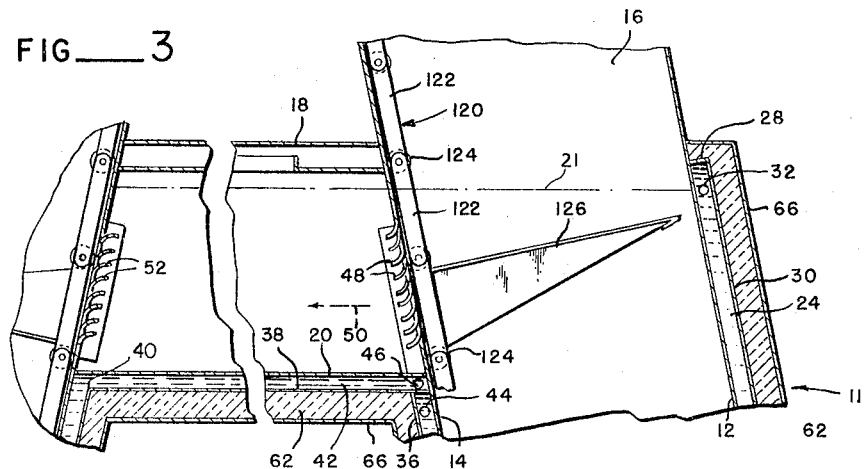
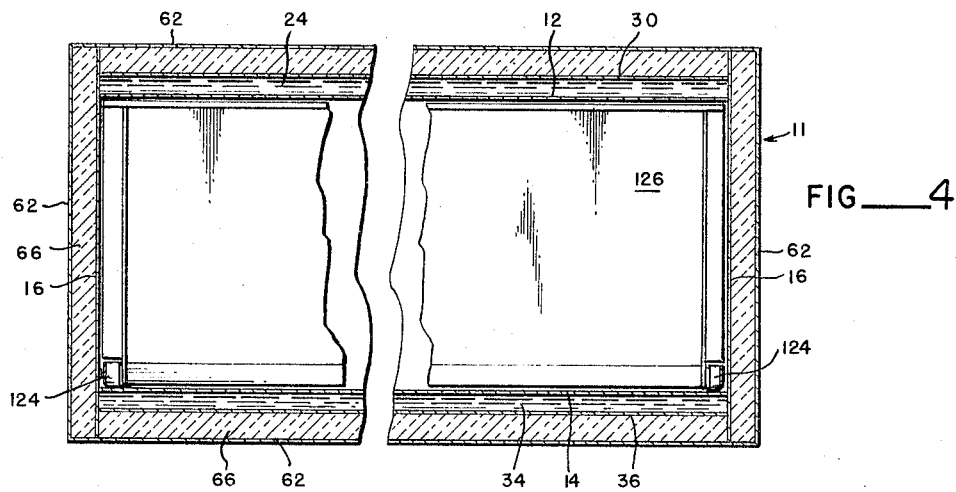
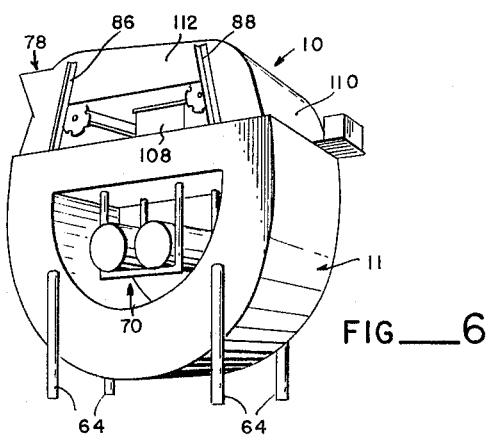
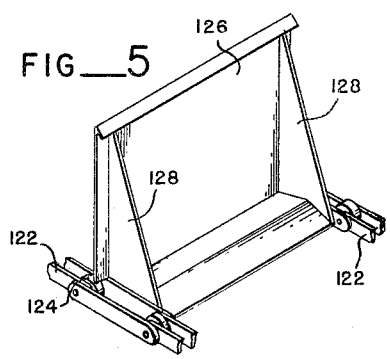
INVENTORS
JOHN F. FLODIN
ALLAN T. FLODIN
BY
ATTORNEYS

… … …

United States Patent Office 3,270,662
Patented Sept. 6, 1966

---

3,270,662
CRAB COOKING APPARATUS
John F. Flodin and Allan T. Flodin, Sunnyside, Wash., assignors to Flodin, Inc., Sunnyside, Wash., a corporation of Washington
Filed Apr. 26, 1965, Ser. No. 450,935
6 Claims. (Cl. 99—404)

This invention relates to an apparatus for cooking crab, fish and the like, and more particularly does this invention relate to a cooking apparatus in which the produce or produce cooked therein is subjected to a closely-controlled and uniformly heated cooking medium.

In the crab fishing industry, it is necessary in order to preserve freshness and quality in crab meat, immediately to cook the crabs as soon as they are caught and then to freeze them for further processing and shipment to market. Such cooking and freezing is normally done on board a processing ship. Conventional and heretofore known methods of cooking have usually depended upon batch cooking in large vats or kettles. Primarily, however, the drawback in cooking aboard ship regardless of the equipment used, involves steam generation for heating the cooking medium. Generation of steam requires large reserves of fresh water aboard ship. Furthermore, steam generation requires that cooking equipment or vessels be capable of withstanding high pressures in the steam jackets and lines. Because of the pressure limitations imposed upon the equipment, the maximum temperatures to which the cooking medium may be heated is perforce limited. Thus it can be seen that presently-used cooking systems carried aboard processing ships are bulky, inefficient, time-consuming and therefore expensive.

This invention seeks to overcome the defects and disadvantages of presently-known equipment by generally providing a continuous cooking apparatus in which the need for steam heat is eliminated. In effect, this cooking apparatus is a large U-shaped or generally semi-circular cooking tank through which is moved a continuous conveyor means. Crabs are fed into one side of the semi-circular tank, and moved by means attached to the conveyor, through the tank and discharges automatically on the other side of the tank. The rate of speed of the conveyor through the cooking tank may be adjusted to precisely control the cooking time. Salt water may be used as a cooking medium, and heat is imparted thereto by a non-pressurized oil jacket both on the inside and outside of the tank. Directly heated oil is circulated through the oil jackets and because the oil does not have to be pressurized, temperatures to which the cooking medium may be raised are not limited by excessive pressures in the heating jackets or lines.

Accordingly, it is a prime feature of this invention to supply a cooking apparatus which is adaptable to cooking crabs, fish, and other food products in a continuous cooking process.

Another feature of this invention is to furnish a cooking apparatus which is simple in design, rugged in construction, and economical to manufacture.

Still another feature of this invention is to provide a cooking apparatus which uses a direct oil heat and therefore eliminates the need for fresh water steam generation.

Yet another feature of this invention is to supply a cooking apparatus which requires no replacement and consumption of fresh water.

Another feature of this invention is to furnish a cooking apparatus in which the only consumable item or material is the heating fuel.

A further feature of this invention is to provide a cooking apparatus wherein the heating medium, namely the oil, can be circulated without generating any pressure beyond that needed to circulate the oil through the jackets.

A still further feature of this invention is to furnish a cooking apparatus in which the cooking medium may be maintained at even and uniform temperatures and wherein maximum temperatures are not limited by pressures in the heating oil jackets and lines.

Yet a further feature of this invention is to supply a cooking apparatus which allows close control of cooking medium temperatures.

An even further feature of this invention is to supply a cooking apparatus wherein temperatures used may exceed those of other cooking devices in which steam is used.

These and other objects, features, and advantages reside in the details of construction and operation as more fully hereinafter described and claimed. Reference will be had to the accompanying drawings, wherein like numerals refer to like parts throughout, and in which:

FIGURE 1 is a side elevational view of the cooking apparatus, showing generally the arrangement of the elements and other details of construction;

FIGURE 2 is a partial view in prespective showing circulating baffle structure employed in the heating oil jackets of the invention;

FIGURE 3 is a partial cross sectional view of the upper end of the tank showing further details of construction of this apparatus;

FIGURE 4 is a plan cross sectional view taken along the line 3—3 of FIGURE 1 showing details of construction of the tank including the cooking medium portion, the heating jackets, and additional details of the conveyor and conveyor flights;

FIGURE 5 is a partial perspective view further clarifying the conveyor and conveyor flight construction; and FIGURE 6 is a perspective view of the cooking apparatus to further clarify its external configuration and other general features of construction.

Referring now to the drawings, it will be seen that the cooking apparatus generally designated by the number 10, has an irregularly-shaped circular construction in which the lower portion thereof is a semi-circularly shaped tank 11 and in which the upper portion is in the form of an inverted U-shape joined with the lower generally semi-circularly shaped tank portion. Cooker 10 has an outer tank wall 12, an inner tank wall 14, and side tank walls 16. The cooking portion of the apparatus is confined to tank 11 which has its upper edge along the line designated by the number 18. An upper, horizontally disposed central wall 20 extends across the top of tank 11, below the water level 21 to define a circulating flume area 22. As can be seen by reference to FIGURE 1, the cooking medium is confined to the tank 11 including the upper central portion thereof or so-called circulating flume 22.

Outside wall 12 of tank 11 forms one wall of an outer heating jacket 24 which extends generally from point 26 or the upper edge level on the feed side of the tank entirely around the outside of the tank, to point 28 on the discharge side of the tank. An outer heating jacket wall 30 extends from point 26 entirely around the outside of tank 11 to point 28 in order to define a heating oil cavity or outer heating jacket 24. The outer jacket cavity 24 as can be seen by reference to FIGURE 3, is entirely confined between the inner and outer jacket walls 12 and 30, and by the side walls 16 of the tank. Heating oil is introduced to outer jacket 24 by a pipe connection at 32 near point 28 and the oil is circulated through the outer jacket to a discharge opening 34 near point 26 on the other side of the tank. In like manner, an inner heating jacket space or cavity 34 is defined between inner tank wall 14 and inner jacket wall 36. It will be noticed that the inner jacket wall 36 extends from the upper inner corner on the discharge side of the tank entirely around on the inside thereof to the upper inner corner on the infeed side of the tank. A generally horizontally disposed flume heating jacket wall 38 is connected to jacket wall 36 as at corner 40 to define the flume heating jacket space 42. It will be seen by reference to FIGURES 1 and 2, that flume heating jacket wall 38 is connected at the upper inner corner of the tank 11 on the discharge side, not only to inner tank wall 14, but also to inner jacket wall 36. In this way, heating oil may be circulated through the inner jackets by introducing the heating oil at point 44 so that the oil is circulated through the inner jacket space 34 past point or corner 40, through the flume heating jacket space 42, to be discharged at connection 46 near connection 44. Inner tank wall 14 on the discharge side of tank 11 has an inlet louver assembly 48 which opens or connects the circulating flume at the top of the tank with the discharge side of the cooking compartment. In this way, as the conveyor, to be described more fully hereinafter, moves upwardly on the discharge side, it pushes the water through inlet louver assembly 48 as indicated by arrow 50 in FIGURE 3, so that the water moves across the tank through the circulating flume 22 and back into the cooking compartment through outlet louver assembly 52 at the opposite end of said circulating flume. An oil drain for the inner heating jacket is placed at the lowermost point of said inner heating jacket as at 54. Similarly, an oil drain 56 for the outer heating jacket is placed at the lowermost point of said outer jacket. A water drain opening 58 is also located at the lowermost point of the cooking compartment of the tank and an access opening 60 for cleanup purposes is also located at the lower portion or bottom of the cooking compartment of the tank.

Tank 11 is entirely surrounded or encased by insulation both on the outside of the heating jackets and on the sides of the compartment. Insulation 66 reduces heat loss and generally contributes to the heating efficiency of the cooking apparatus. Tank 11 is supported on appropriate frame or leg means 64. Insulation 66 may be protected by light sheet metal coating 62 as compared to the heavier plate which is used for the tank and heating oil jackets. The heating and pumping mechanism, generally designated by the number 70, for heating and circulating the heating oil, is conveniently located in the void area defined by the circulating flume and the tank. This area is large enough to contain a heating unit for the heating oil and the pumping means for circulating the heating oil through the jackets.

The upper portion or housing of the cooking apparatus, generally designated by the number 72, incorporates a feed chute, drive mechanism for the conveyor, a removal flume, and other features to complete the apparatus. Outer tank wall 12 on the infeed side above point 26 extends for a short distance above the tank in the form of wall 74. At a predetermined distance above the outer wall 74, a feed chute wall 76 extends outwardly and upwardly to define a feed chute or hopper space 78. On the discharge side of the upper portion 72 is the outer wall 80 extending upwardly past point 28 from outer tank wall 12. Inner wall 14 of the tank above the outlet louvers 52 extends upwardly above the circulating flume to define a short wall 82 on the feed side and short wall 84 on the discharge side. Generally upstanding angles or support members 88 on both sides of the cooking apparatus support the drive sprocket 90, drive chain or belt 92, and the drive motor and reduction gear 94. The drive sprocket 90 can be seen to be mounted on drive shaft 96 which also carries conveyor drive means 98. Opposite the drive sprocket and also mounted in appropriate bearing structure 100 connected to upstanding supports 86 is shaft 102 with idler conveyor chain sprocket 104. The conveyor chain and flights are supported at the upper end by conveyor sprockets 98 and 104 with the conveyor rollers riding on the inner tank wall 114 through the cooking tank. It will be seen that a discharge chute 106 is attached at the upper end of the discharge side to allow the cooked material being raised from the cooking tank to slide into the water removal flume 108 as a flight of the conveyor chain rises out of the cooking tank and swings around discharge conveyor sprocket 98. The upper portion of the cooking apparatus is enclosed or housed with light gage metal sheeting and has outside housing 110 and side housing 112. The upper side housing connects to the tank side housing 16, a removable hood srtucture 114 is attached to the extreme top portion of the cooking apparatus in the outer housing wall 110.

The continuous conveyor, generally designated by the number 120, comprises two separate spaced-apart chains 122 in the form of links which have rollers 124 at the connecting point for each pair of links. Since the conveyor chains are spaced apart so that each run along the side of the cooking apparatus, there is void or negative space between said chains. Extending between and supported by chains 122 in the form of outstanding impervious conveyor flights are panels 126. The flight panels 126 have supporting gussets 128 and as can be seen by reference to FIGURE 4, said panels 126 extend generally from side wall to side wall 16 of the cooking tank and from inner wall 14 to outer wall 12 thereof, giving a very slight amount of clearance between the panel edges and the respective walls of the tank.

In order to insure proper circulation of the heating oil in the heating jackets 24, 34, and 42, said jackets or heating oil spaces contain baffle structure as shown in FIGURE 2. FIGURE 2 is illustrative of the baffle structure in both the inner and outer heating oil jackets. Baffles 130 extend alternately from one side wall and then the other so as to leave a space at the outer end of the baffle around which the heating oil may pass. Alternately then, the next baffles 130 will extend from the open side in staggered arrangement so that the heating oil takes a zig-zag course through the heating jackets as shown by arrows 132 and 134. It will be seen from the above description that heating oil may be heated in the heating and circulating unit 70, and with appropriate pumping and piping directed to the heating jackets. Only enough pumping pressure is required to insure proper circulation of the heating oil through the heating jackets and hence leakage is not a problem as in those instances in which steam generation is employed. And because the only pressure needed is that required to circulate the heating oil, the temperature of the heating oil in the jackets may be raised to any needed temperature.

The conveyor structure is such that the flight panels 126 circulate the cooking medium, which aboard ship would usually be salt water, and push the cooking medium in a continuous crculating path down the feed side of the cooking tank, up the discharge side, through the inlet louver 48, through circulating flume 22, and back into the heating tank through outlet louvers 52. Such circulation of the cooking medium insures uniform temperatures throughout the cooking medium. Crabs or material being cooked may be fed into the chute or hopper 78 to fill a compartment defined between panel flights 126 and then taken down through the cooking tank and back up the discharge side. As the flight panels 126 pass over discharge sprocket 98, the cooked material slides out on chute 106 and into the water removal flume 108. It will be appreciated that the speed of the conveyor may be regulated to adjust the cooking time. Also, the heating oil for the cooking medium and therefore the temperature of the cooking medium itself may be very closely controlled. Batch cooking of freshly caught crabs or other products or produce is eliminated in favor of the continuous cooking process made possible by this invention.

It will be appreciated that modifications and changes will occur to those skilled in the art, and that the preferred embodiment shown is merely illustrative of the principles of ths invention. Hence it is not desired to limit the invention to the exact construction shown and described. Accordingly, all suitable modifications and equivalents may be resorted to which fall within the scope of the invention.

What is claimed is:

1. A continuous cooking apparatus, comprising: (a) a lower section having generally semi-circular, spaced apart inside and outside walls and also having side walls to define a generally U-shaped cooking tank; (b) a generally horizontally disposed circulating flume interconnecting and opening into the upper portions of said cooking tank; said circulating flume having a bottom wall connected to said inside wall of said cooking tank (c) an upper section including frame members and conveyor sprocket means supported on said frame members above said cooking tank; (d) a continuous conveyor means supported on and driven by said sprocket means and extending through said cooking tank, said conveyor having spaced apart continuous chain means with unobstructed space therebetween which contact and move on said inside wall and also having upstanding flight panels attached to and generally equispaced on said chain means; and (e) heating oil jacket means adjacent to said inside and outside walls and also adjacent the bottom wall of said circulating flume.

2. A continuous cooking apparatus, comprising: (a) a lower section having generally semi-circular, spaced apart inside and outside walls and also having side walls to define a generally U-shaped cooking tank; (b) a generally horizontally disposed circulating flume interconnecting and opening into the upper portions of said cooking tank; said circulating flume having a bottom wall connected to said inside wall of said cooking tank (c) an upper section including frame members and a pair of conveyor sprocket means one each of which is supported on said frame members over said cooking tank generally above each end of said circulating flume; (d) a continuous conveyor means supported on and driven by one of said sprocket means and extending through said cooking tank, said conveyor having spaced apart continuous chain means with unobstructed space therebetween which contact and move on said inside wall and also having upstanding flight panels attached to and generally equispaced apart on said chain means to define conveyor compartment spaces; and (e) heating oil jacket means adjacent said inside and outside walls and also adjacent the bottom wall of said circulating flume.

3. A continuous cooking apparatus, comprising: (a) a lower section having generally semi-circular, spaced apart inside and outside walls and also having side walls to define a generally U-shaped cooking tank; (b) a generally horizontally disposed circulating flume interconnecting and opening into the upper portions of said cooking tank; said circulating flume having a bottom wall connected to said inside wall of said cooking tank (c) an upper section including frame members and conveyor sprocket means supported on said frame member above said cooking tank; (d) a continuous conveyor means supported on and driven by said sprocket means and extending through said cooking tank, said conveyor having a pair of spaced apart continuous chain means with unobstructed space therebetween which contact and move on said inside wall and also having upstanding generally impervious flight panels attached to and generally equispaced on said chain means; (e) heating oil jacket means adjacent said inside and outside walls and also adjacent the bottom wall of said circulating flume, said jacket means having inlet and outlet means therein for circulating heating oil thereto.

4. A continuous cooking apparatus, comprising: (a) a lower section having generally semi-circular, spaced apart inside and outside walls and also having side walls to define a generally U-shaped cooking tank; (b) a generally horizontally disposed circulating flume interconnecting and opening into the upper portions of said cooking tank; said circulating flume having a bottom wall connected to said inside wall of said cooking tank (c) an upper section including frame members and conveyor sprocket means supported on said frame member above said cooking tank; (d) a continuous conveyor means supported on and driven by said sprocket means and extending through said cooking tank, said conveyor having spaced apart continuous chain means with unobstructed space therebetween which contact and move on said inside wall and also having upstanding flight panels attached to and generally equispaced on said chain means, said upper section including housing means enclosing said conveyor means; and (e) heating oil jacket means adjacent said inside and outside walls of said cooking tank and also adjacent the bottom wall of said circulating flume.

5. A continuous cooking apparatus, comprising: (a) a lower section having generally semi-circular, spaced apart inside and outside walls and also having side walls to define a generally U-shaped cooking tank; (b) a generally horizontally disposed circulating flume interconnecting and opening into the upper portions of said cooking tank; said circulating flume having a bottom wall connected to said inside wall of said cooking tank (c) an upper section including frame members and conveyor sprocket means supported on said frame member above said cooking tank; (d) a continuous conveyor means supported and driven by said sprocket means and extending through said cooking tank, said conveyor having spaced apart continuous chain means with unobstructed space therebetween which contact and move on said inside wall and also having upstanding flight panels attached to and generally equispaced on said chain means; (e) enclosed heating oil jacket cavities adjacent said inside and outside walls and also adjacent the bottom wall of said circulating flume, said heating oil jacket cavities being defined by heating oil jacket walls in spaced relation to said inside and outside walls.

6. A continuous cooking apparatus, comprising: (a) a lower section having generally semi-circular, spaced apart inside and outside walls and also having side walls to define a generally U-shaped cooking tank; (b) a generally horizontally disposed circulating flume interconnecting and opening into the upper portions of said cooking tank, said circulating flume having side walls connected to said side walls of said cooking tank and a bottom wall connected to said inside wall of said cooking tank; (c) an upper section including frame members and conveyor sprocket means supported on said frame member above said cooking tank; (d) a continuous conveyor means supported and driven by said sprocket means and extending through said cooking tank, said conveyor having spaced apart continuous chain means with unobstructed space therebetween which contact and move on said inside wall and also having upstanding flight panels attached to and generally equispaced on said chain means; (e) enclosed heating oil jacket cavities adjacent said inside and outside walls and also adjacent the bottom wall of said circulating flume, said heating oil jacket cavities being defined by heating oil jacket walls in spaced relation to said inside and outside walls and to said bottom wall, the heating oil cavity adjacent said bottom wall connecting to one end of said cavity adjacent said inside wall.

References Cited by the Examiner

UNITED STATES PATENTS

| | | | |
|---|---|---|---|
| 2,319,561 | 5/1943 | Scharsch | 99—404 |
| 2,475,523 | 7/1949 | Schroeder | 99—404 |
| 2,556,385 | 6/1951 | Allan | 99—443 X |
| 2,853,937 | 9/1958 | Peck | 99—404 |
| 2,985,210 | 5/1961 | Magnuson | 99—443 X |

IRVING BUNEVICH, *Primary Examiner.*